US005778073A

United States Patent [19]

Busching et al.

[11] Patent Number: 5,778,073

[45] Date of Patent: Jul. 7, 1998

[54] METHOD AND DEVICE FOR SPEECH ENCRYPTION AND DECRYPTION IN VOICE TRANSMISSION

[75] Inventors: Wolfram Busching, Sölden; Erhard Schlenker, Schallstadt; Günter Spahlinger, Stuttgart, all of Germany

[73] Assignee: Litef, GmbH, Germany

[21] Appl. No.: 648,084

[22] PCT Filed: Nov. 9, 1994

[86] PCT No.: PCT/EP94/03693

§ 371 Date: May 14, 1996

§ 102(e) Date: May 14, 1996

[87] PCT Pub. No.: WO95/15627

PCT Pub. Date: Jun. 8, 1995

[30] Foreign Application Priority Data

Nov. 19, 1993 [DE] Germany .......................... 43 39 464.7

[51] Int. Cl.[6] .............................. H04K 1/02; H04K 1/10; H04L 9/00

[52] U.S. Cl. .................................. 380/33; 380/9; 380/28; 380/40

[58] Field of Search .................................... 380/9, 20, 21, 380/28, 41, 33, 38, 39, 40, 49, 50, 59, 34, 46, 48

[56] References Cited

U.S. PATENT DOCUMENTS

| | | | |
|---|---|---|---|
| 5,048,086 | 9/1991 | Bianco et al. | 380/28 |
| 5,245,660 | 9/1993 | Pecora et al. | 380/48 |
| 5,291,555 | 3/1994 | Cuomo et al. | 380/9 X |
| 5,379,346 | 1/1995 | Pecora et al. | 380/48 |

FOREIGN PATENT DOCUMENTS

| | | |
|---|---|---|
| 0204226A2 | 12/1986 | European Pat. Off. . |
| 0313029 | 4/1989 | European Pat. Off. . |
| 2606237 | 5/1988 | France . |
| 2943115 | 5/1981 | Germany . |
| 3129911C2 | 3/1983 | Germany . |

OTHER PUBLICATIONS

Patent Abstracts of Japan; vol. 13, No. 109; App. No. JP870112620, App. Date Nov. 5, 1987.

*Primary Examiner*—Bernarr E. Gregory
*Attorney, Agent, or Firm*—Elliott N. Kramsky

[57] ABSTRACT

A digitized real voice signal is converted via complex filtering into a complex signal that is subjected to sampling rate reduction, the bandwidth of the respective complex filter corresponding to the sampling rate. The complex signal is phase-modulated by means of a code signal generated by a random-number generator and additively combined with a pilot signal (likewise phase-modulated in a random distribution) to form an encrypted useful signal for transmission. The useful signal is sequentially transmitted together with a preamble for synchronization and signal equalization at the receiver end. At the receiver end, clock synchronization is forced for a phase-modulated pilot signal produced at the receiver end and equalizer coefficients for an equalizer at the receiver end are calculated from the digitized received signal after complex filtering and corresponding sampling rate reduction, during a preamble recognition phase, at which point the phase of the useful signal decryption is initialized. The encrypted, transmitted signal is separated from its phase-modulated pilot signal, which is superimposed at the transmitter end, by linking to the synchronized pilot signal, which is produced at the receiver end, and the phase-modulated, encrypted digital speech signal thus obtained is subsequently decomposed by the code signal produced at the receiving end and clockcontrolled by the preamble.

22 Claims, 9 Drawing Sheets

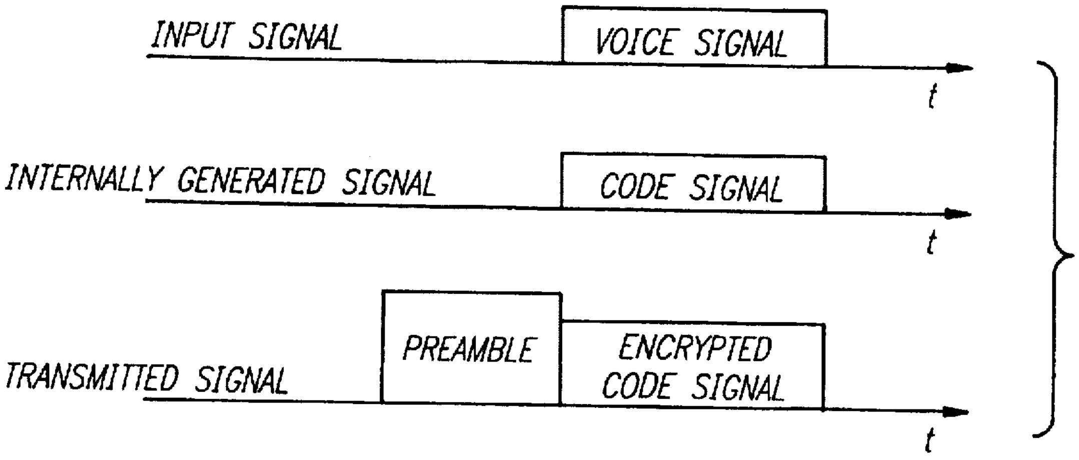
FIG. 2
FIG. 3
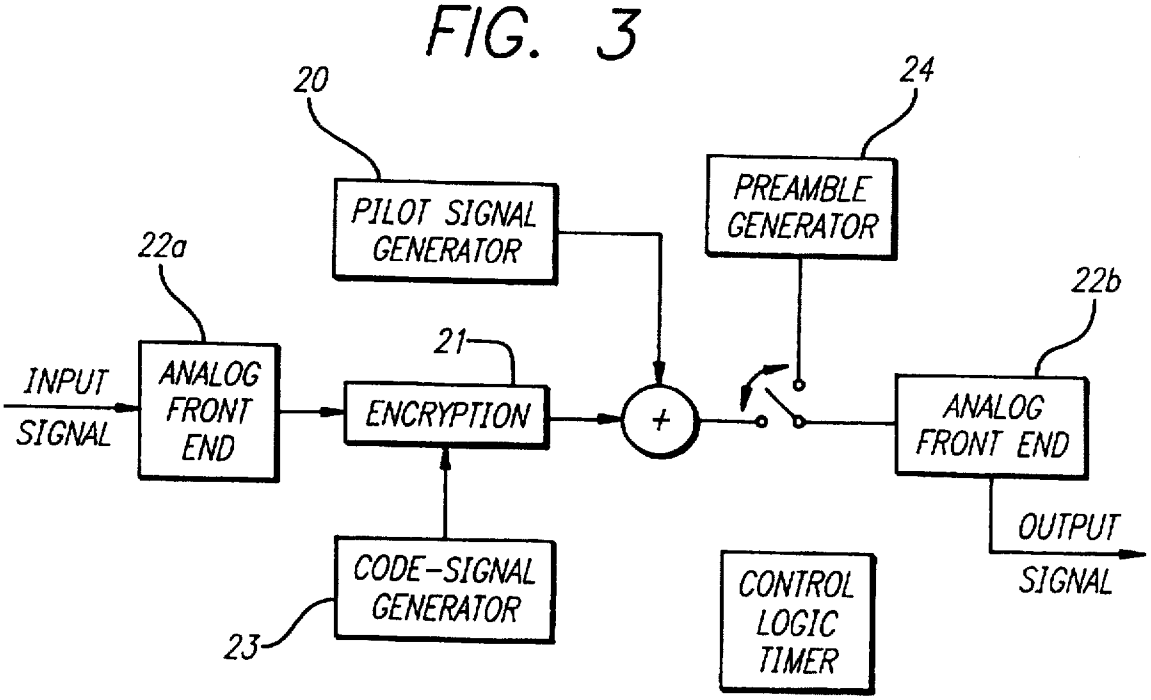

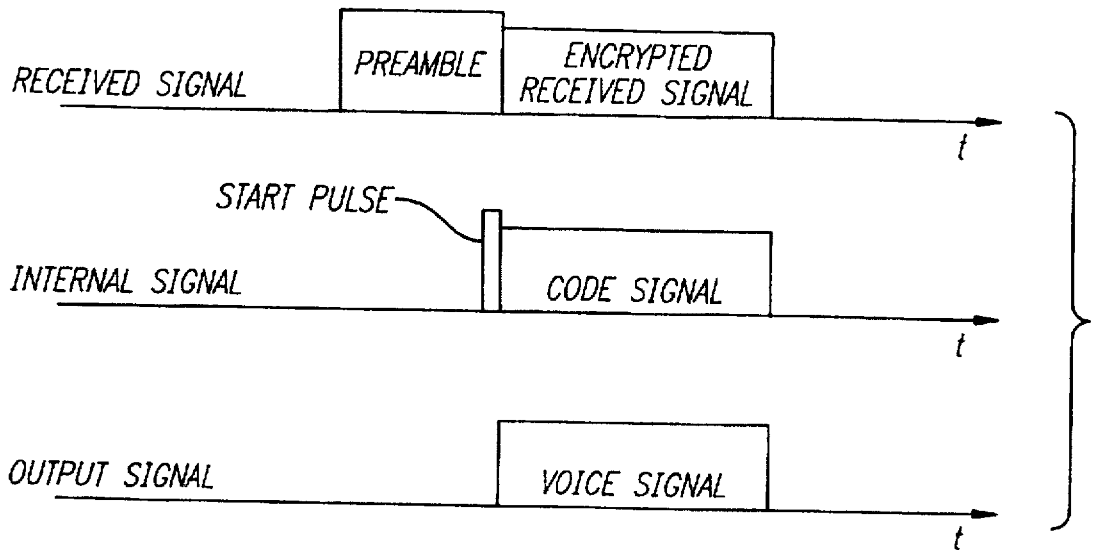
FIG. 4
FIG. 5
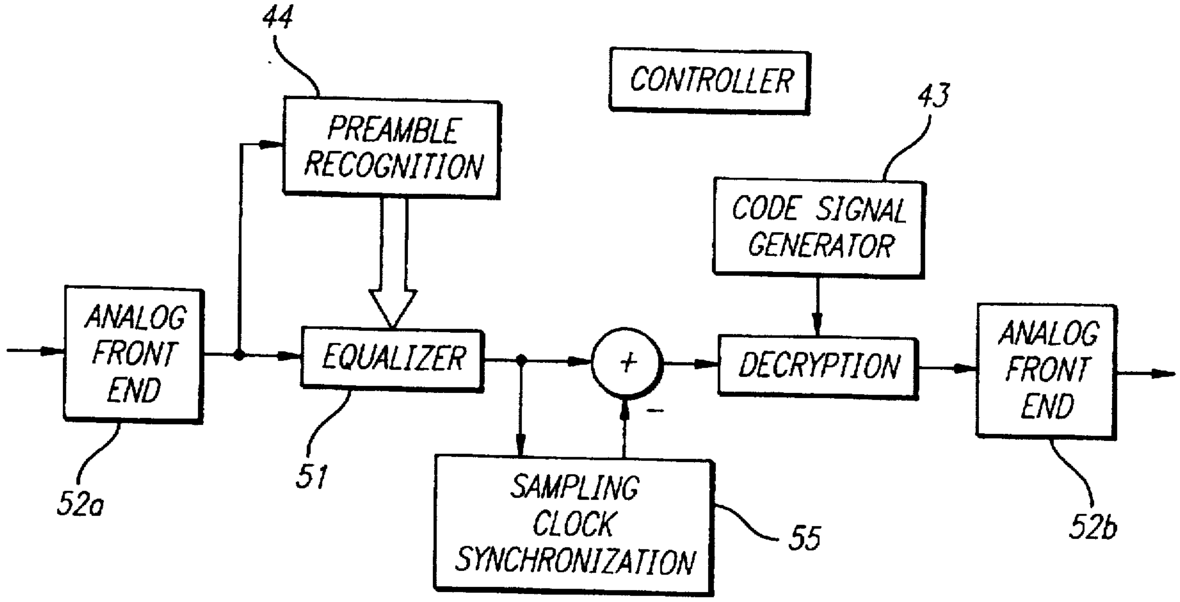

METHOD AND DEVICE FOR SPEECH ENCRYPTION AND DECRYPTION IN VOICE TRANSMISSION

BACKGROUND

1. Field of the Invention

The present invention relates to methods and apparatus for the encryption and decryption of speech in voice transmission. More particularly, the invention pertains to voice transmission apparatus of the type that includes a front-end unit for digitizing a voice signal and matching a transmitted signal to a predetermined transmission channel and for digitizing a received signal and matching the conditioned received signal to a voice reproduction device.

2. Description of the Prior Art

Reference will be made in the discussion that follows to the methods listed immediately below that relate to the prior art for voice encryption and decryption.

1. Digitizing of voice signals, encoding of the digital values and transmission as digital data using a MODEM.
2. Storage of a sequence of the voice signal, division of the sequence into a plurality of smaller time intervals, transmission of such sub-sequences in a sequence other than the original.
3. Division of the spectral band to be transmitted into smaller sub-bands, transmission of a signal which is produced by interchanging spectral sub-bands.
4. Frequency-band inversion, i.e. interchanging of high and low frequencies of the audio-frequency spectrum to be transmitted using a fixed or variable splitting device (mirror-image frequency method).
5. Combination of methods 2 to 4.

The above known methods are subject to the following fundamental disadvantages:

Regarding 1) As a rule, the same channels must be employed for transmission of the digital data as for unencrypted speech. Since such channels are of limited bandwidths, data reduction methods are required. After reconstruction of the (reduced) data at the receiving end, it is impossible to identify the person speaking reliably.

Regarding 2) For physiological reasons, the number and time duration of the sub-interval can only be varied within strict limits, simplifying decoding of the transmitted signal.

The transitions between interchanged sub-intervals generally cannot be reconstructed in proper phase at the receiving end. As a result, a noticeable reduction in signal quality is heard when compared to the unencrypted signal.

A fundamental, perceptible delay exists between speech and signal transmission that can lead to disturbing echo effects in certain types of transmission channels.

Regarding 3) The number and bandwidths of the spectral sub-intervals are strictly limited due to physiological considerations, making decoding easy. Unavoidable bandwidth overlaps of the filters required for production and reconstruction of the sub-spectra lead to a deterioration in transmission quality.

Regarding 4) Decoding of the transmitted signal can be done with a relatively minor technical investment. The residual comprehensibility of the encrypted signal is high; trained listeners can monitor transmissions without technical aids.

Regarding 5) Combinations of the various methods generally enhance security against decryption. Unfortunately, they also lead to accumulation of such undesirable properties as the deterioration of signal-to-noise ratio and limitation to a small number of simple constellations of transmission channels.

SUMMARY AND OBJECTS OF THE INVENTION

It is therefore an object of the present invention to create a method and apparatus for speech encryption and decryption of voice transmission suitable for production as a compact module that can be retrofitted.

It is a further object of the invention to achieve the above object while obtaining improved security against monitoring and evaluation by third parties over that offered by known methods and devices.

Other objects of the invention include achieving the above-stated object while obtaining good speech comprehensibility and voice recognition, little variance in quality from clear operation, operation and controllability that are largely transparent to the user, automatic recognition of encrypted signals at the receiving end, capability of use in analog radio networks and in the telephone field and conformity with the specified available transmission bandwidths.

The preceding and other objects are addressed by the present invention which provides, in a first aspect, a method for speech encryption and decryption of a voice transmission. Such method is begun by converting the digitized voice signal $c(v)$ into a complex signal $x(n)$ at a transmitting end by means of a first complex input filter whose bandwidth corresponds to that of the transmission channel. The complex signal is phase-modulated at the transmitting end by means of a code signal $(z_s(n))$ that is controlled by pseudo-random numbers.

The phase-modulated voice signal $(y(n))$ is then additively combined with a pilot signal $(q(n))$ that is also phase modulated in a pseudo-random distribution at the transmitting end to form an encrypted information signal $(s(n))$ for transmission. The information signal is passed through a first complex output filter at the transmitting end in a sequential manner together with a preamble for synchronization and information signal equalization at a receiving end, as a complex signal $(w(n))$, to produce a real output signal $(c_s(v))$. The real output signal is then converted to an analog signal at the transmitting end and the analog signal is passed to a transmitting signal conditioner.

The digitized received signal $(\hat{c}(v))$ is converted to a complex signal $(\hat{s}(n))$ at a receiving end by means of a second complex input filter whose bandwidth corresponds to the bandwidth of the transmission channel. The decryption of the complex information signal $(\hat{s}(n))$ is begun at the receiving end during a preamble recognition phase by forcing clock synchronization for a pilot signal $(p(n))$ produced and phase-modulated in a pseudo-random sequence initialized by the preamble and calculating equalizer coefficients for an equalizer. The encrypted information signal $(\hat{s}(n))$ is then separated from its phase-modulated pilot signal (superimposed at the transmitting end) by linking with the synchronized phase-modulated pilot signal $(q(n))$ produced at the receiving end. The phase-modulated, encrypted digital voice signal $(\hat{y}(n))$ is decrypted by inverse phase modulation by means of the code signal $(z_s(n))$ produced at the receiving end and clock-controlled by means of the preamble. The decrypted signal is passed as a complex signal $(\hat{x}(n))$ through a second complex output filter at the receiving end to produce a real output signal $(\hat{c}_s(v))$. The real output is then converted to analog and the analog signal is passed to a received signal conditioner at the receiving end.

In another aspect, the invention provides apparatus for speech encryption and decryption in a voice transmission device of the type that is equipped with a front-end unit for digitizing a voice signal and matching a transmitted signal to a predetermined transmission channel and/or digitizing a received signal and matching the conditioned received signal to a voice reproduction device. Such apparatus includes a code generator at a transmitting end that is controlled by a (pseudo)-random-number generator. The (pseudo)-random-number generator is arranged to act on a digital phase modulator at the transmitting end for phase-modulating the digitized voice signal.

A pilot signal generator at the transmitting end is provided for generating a pilot signal (p(n)). Means are provided at the transmitting end for phase modulating the pilot signal in a random distribution.

Means are additionally provided at the transmitting end for combining the phase modulated voice signal (y(n)) with the modulated pilot signal to form signal (s(n)). A preamble generator at the transmitting end produces a preamble (v(n)) for synchronization at the receiving end and for information-signal equalization. A changeover switch at the transmitting end is provided for sequentially emitting the preamble together with the signal (s(n)) to the front-end unit for transmitted signal conditioning. The changeover switch is operated in a defined clock sequence.

A digital equalizing filter is provided at a receiving end whose coefficients are calculated and set during reception of the preamble for equalization of the transmission channel of the digitized received signal. Means are provided at the receiving end for detection of the preamble within the received information signal. Such means initiates, as a function of a defined section of the preamble, calculation of the filter coefficients for the equalizer filter in a higher-level computation unit to initialize decryption of the information signal by activating a clock synchronization device.

A pilot-tone generator, a random-number generator and a modulator are provided at the receiving end. The clock synchronization device supplies a control signal for sampling clock correction from the received demodulated pilot signal by complex multiplication by a pilot tone generated at the receiving end and, under control of the random number generator initialized with the clock synchronization, also supplies a phase-modulated pilot signal (q(n)) from the pilot tone from the pilot-tone generator via the modulator.

Means are provided for subtracting the phase-modulated pilot signal (q(n)) from the equalized signal ($\hat{s}(n)$) to separate the transmitted pilot signal. A phase demodulator, controlled by the synchronized random-number generator at the receiving end, is provided for converting the phase-modulated voice signal into the unmodulated-digital voice signal which is passed to the front-end unit for conversion into an audio signal.

The foregoing and other features and advantages of this invention will become further apparent from the detailed discussion that follows. Such discussion is accompanied by a set of drawing figures. Numerals of the drawing figures, corresponding to those of the written description, point to the various features of the invention. Like numerals refer to like features of the invention throughout both the written description and the drawing figures.

BRIEF DESCRIPTION OF THE DRAWINGS

FIG. 2 is a series of diagrams for illustrating the principle of encryption employing an arbitrarily selected time profile;

FIG. 3 is a functional block diagram of the transmitting section of the SE module;

FIG. 4 is a series of diagrams for illustrating the principle of decryption, without reference to a particular time scale;

FIG. 5 is a functional block diagram of the receiving section of the SE module;

DETAILED DESCRIPTION OF THE PREFERRED EMBODIMENT

In order to simplify understanding of the invention, the arrangement and method of operation of an exemplary embodiment of an SE (speech encryption/decryption) module in accordance therewith are described in separate sections, below.

1. Circuit Description of the SE Module

Figure 1:
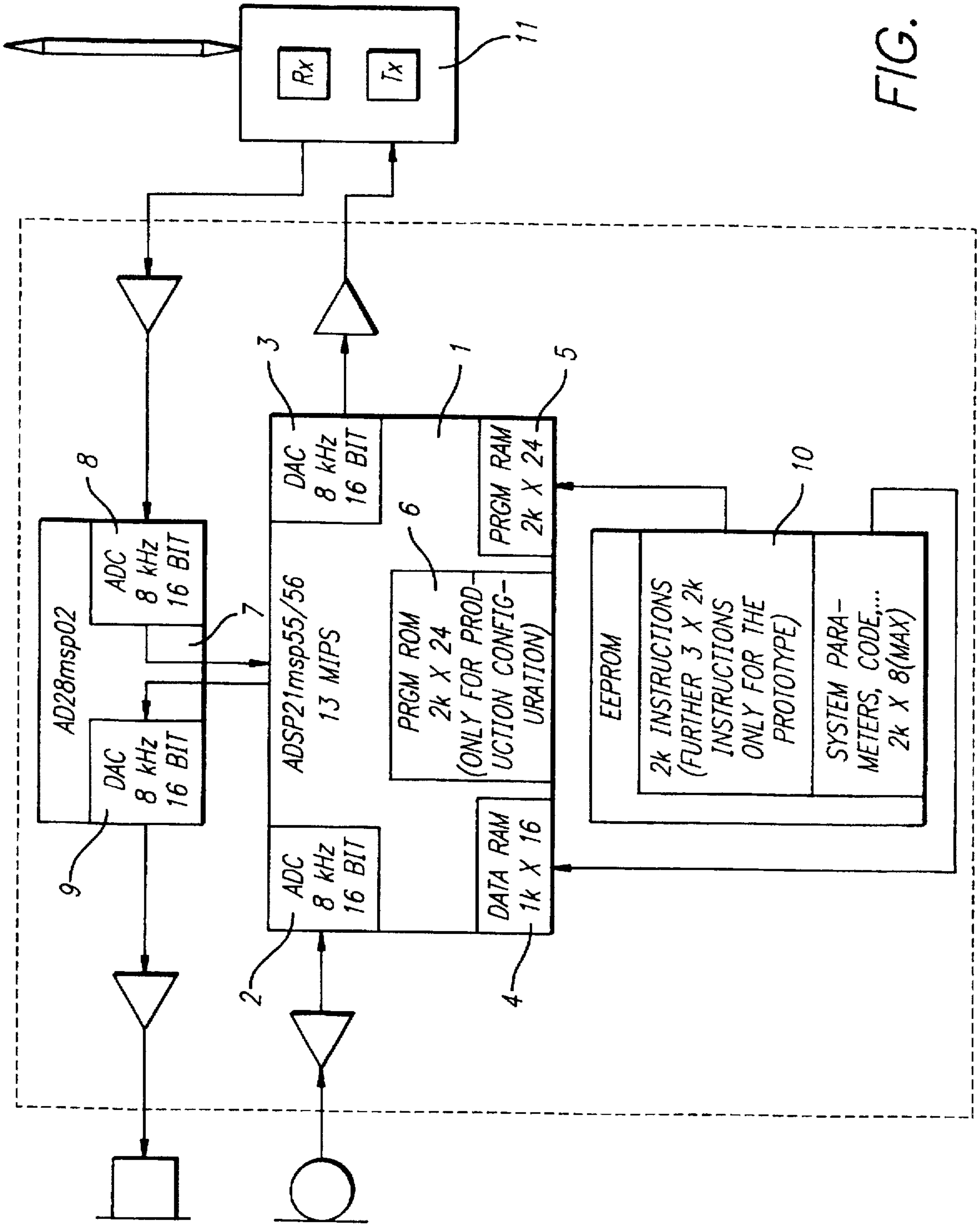
FIG. 1 is a block diagram of a speech encryption/decryption module in accordance with the invention ("SE module")

The SE module consists of a high-performance, digital signal processor system and peripherals linked to modern signal processing algorithms. The block diagram of FIG. 1 illustrates the components and assemblies that are required for digital signal processing. Such functions as power supply, clock generation, discrete inputs and analog input and output stages are not illustrated for purposes of clarity.

The arrangement of the SE module as illustrated in FIG. 1 corresponds to an implemented and working prototype that is still employed to some extent for algorithm testing and design and further illustrates a proposed production design. However, the exemplary embodiment described is to be understood to represent only a single possible embodiment of the invention and is not to be otherwise limiting. Rather, as will be appreciated by one skilled in the art, a large number of modifications and changes in all the sub-areas and assemblies, both at the transmitting end and at the receiver end, are possible without departing from the scope of the technical teaching communicated here.

The major signal processing unit, at least at the prototype stage, comprises a signal processor 1 such as the processor type ADSP21msp55 that is commercially available from the Analog Devices Company. Such signal processor 1 includes an A/D converter 2 and a D/A converter 3 of, for example, 16 bit resolution and 8 kHz sampling rate. Separate RAM regions 2, 3 are integrated for data (1k×16) and program (2k×24) respectively. The internal memory organization corresponds to the Harvard architecture whereby a single data access is possible during each command cycle in addition to the Op-Code-Fetch. All processor operations, without exception, require one cycle. Processing power of 13 MIPS (integer) is thus available.

A mask-programmed variant of the processor (ADSP21msp56) is suitable for series production. Such apparatus additionally possesses a 2k×24 bit ROM 6 on the program-memory side.

A further A/D and D/A converter pair 8, 9 is required for duplex operation. This is preferably implemented by means of a Type AD28msp02 converter chip 7 that contains, in a separate housing, a converter identical to that of the signal processor 1. Data transmission between the converter chip 7 and the signal processor 1 is carried out by means of fast serial interfaces.

An EEPROM 10 is provided for external memory. The EEPROM 10 accommodates program parts (which can be loaded) as well as those variables that are only rarely changed such as the encryption key (see below). Memory sizes of 8k×8 for production and 32k×8 for prototype versions are suitable for the arrangement of FIG. 1.

The status of a voice key, squelch logic of a radio apparatus 11 and a Crypt-ON/OFF switch can be interrogated by the signal processor 1 in response to discrete input signals (not illustrated).

The operating sequence, further details of which will be described in conjunction with the signal processing, can be briefly described as follows: After application of the operating voltage, a RESET signal of several milliseconds duration is produced. Later, the signal processor 1 loads the internal program RAM 5 with the content of the external EEPROM 10 and starts the program. In the prototype SE module, the entire program required at a specific time must initially still be accommodated in the RAM (2k instructions). In the production configuration of the SE module, 2k instructions are additionally available in the ROM 6.

The external EEPROM 10 can also be addressed as a data memory to read and change variable parameters, such as, for example, the encryption key.

The program sequence is structured in time by interrupts of the analog interfaces that run freely at their specified conversion rate of 8 kHz and in each case trigger an interrupt after conversion has been accomplished.

2. Signal Processing

All functions of the SE module are implemented by digital signal processing, the principles of which will first be explained. FIG. 3 is a functional block diagram of the transmitting section of the SE module. A code signal, with whose aid the input signal of the microphone (i.e., the voice signal) is encrypted, is generated at the transmitting end in a code signal generator 23. As illustrated in the three time-related diagrams of FIG. 2, a so-called preamble, produced in a preamble generator 24, is transmitted immediately before the encrypted voice signal by operating a PTT key (not illustrated).

The preamble is required for synchronization of another code signal generator 43 (refer to FIG. 5) and for setting an equalizer 40 at the receiving end.

To make it possible to connect into an ongoing conversation, the preamble is transmitted periodically in a fixed time frame such as, for example, every 5 seconds, in the case of the prototype presently being tested. In such case, the encrypted voice signal is masked out for the duration of the preamble (for example, approximately 200 ms).

A pilot signal generator 20 supplies a special pilot signal that is additively linked to the encrypted voice signal and used at the reception end for synchronization of the sampling clock, explained below in detail. The front-end unit 22a/22b, illustrated in two sub-blocks, carries out the preconditioning of the analog input signal and its conversion into a digital signal. In addition, it performs the final conditioning of the voice signal encrypted at the transmitting end and matching to the transmission device and transmission channel. Further details are discussed below.

As can be seen in FIG. 4, the start of an encrypted transmitted signal is characterized by the preamble. As such, analysis of the received signal always takes place at the receiving end when the receiver is not in the decryption mode. During this phase, the received signal is passed on unchanged by the SE module. If the end of a preamble is recognized, decryption is begun (i.e., the code generator 43 at the receiving end is initiated) and the information signal received is decrypted ("voice signal" in FIG. 4).

FIG. 5 is a functional block diagram of the receiving section of the SE module. The received signal is supplied to a functional block 44 whose object is to recognize and analyze the received signal. If a preamble is received, the properties of the transmission channel are first determined by using the preamble and the filter coefficients of an equalizer 51 at the receiving end are then determined therefrom.

When the end of the preamble is detected, an equalizer matched to the transmission channel is made available. Reference is made to U.S. Pat. No. 5,267,264 (reference [4]), property of the assignee herein, with respect to details of the initial synchronization and matching of a receiving filter of a digital receiver. At the same time, the code generator 43 at the receiving end is started to decrypt the information signal. The sampling synchronization 55 evaluates the pilot signal superimposed on the information signal and separates it from the information signal. The decrypted information signal is then passed on.

Figure 6:
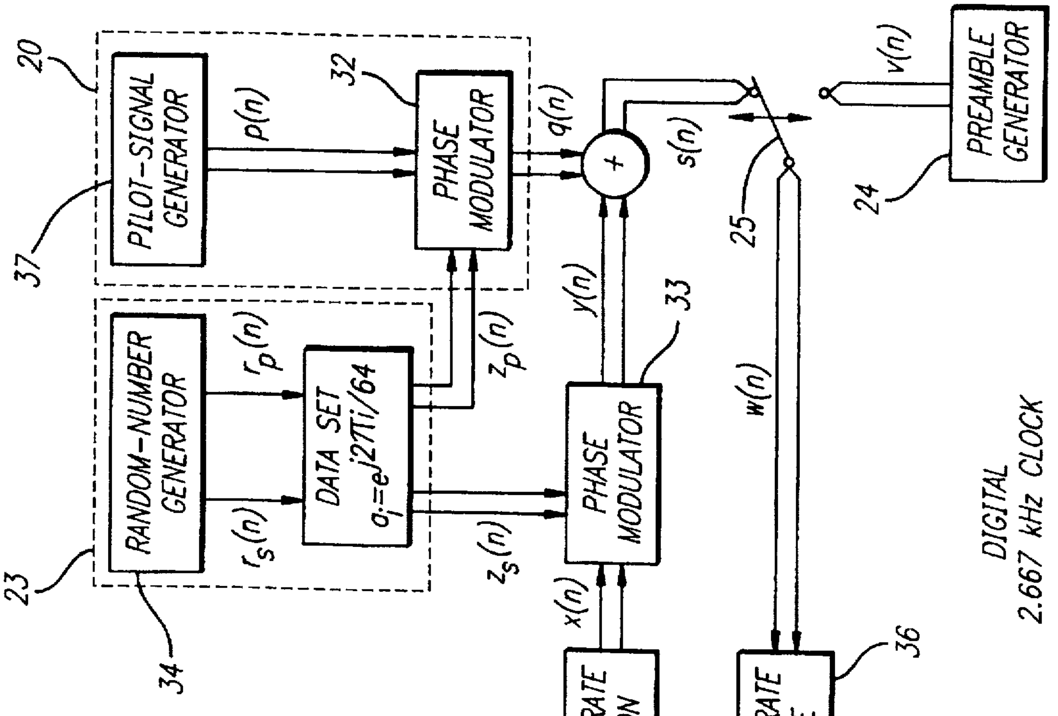
FIG. 6 is a block diagram for illustrating signal processing at the transmitting end of the SE module.
Figure 6:
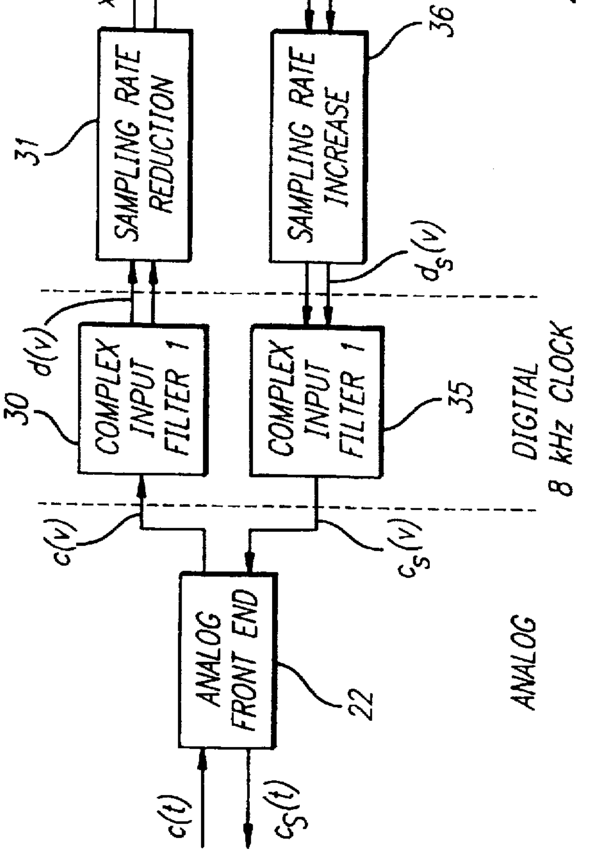
Figure 13:
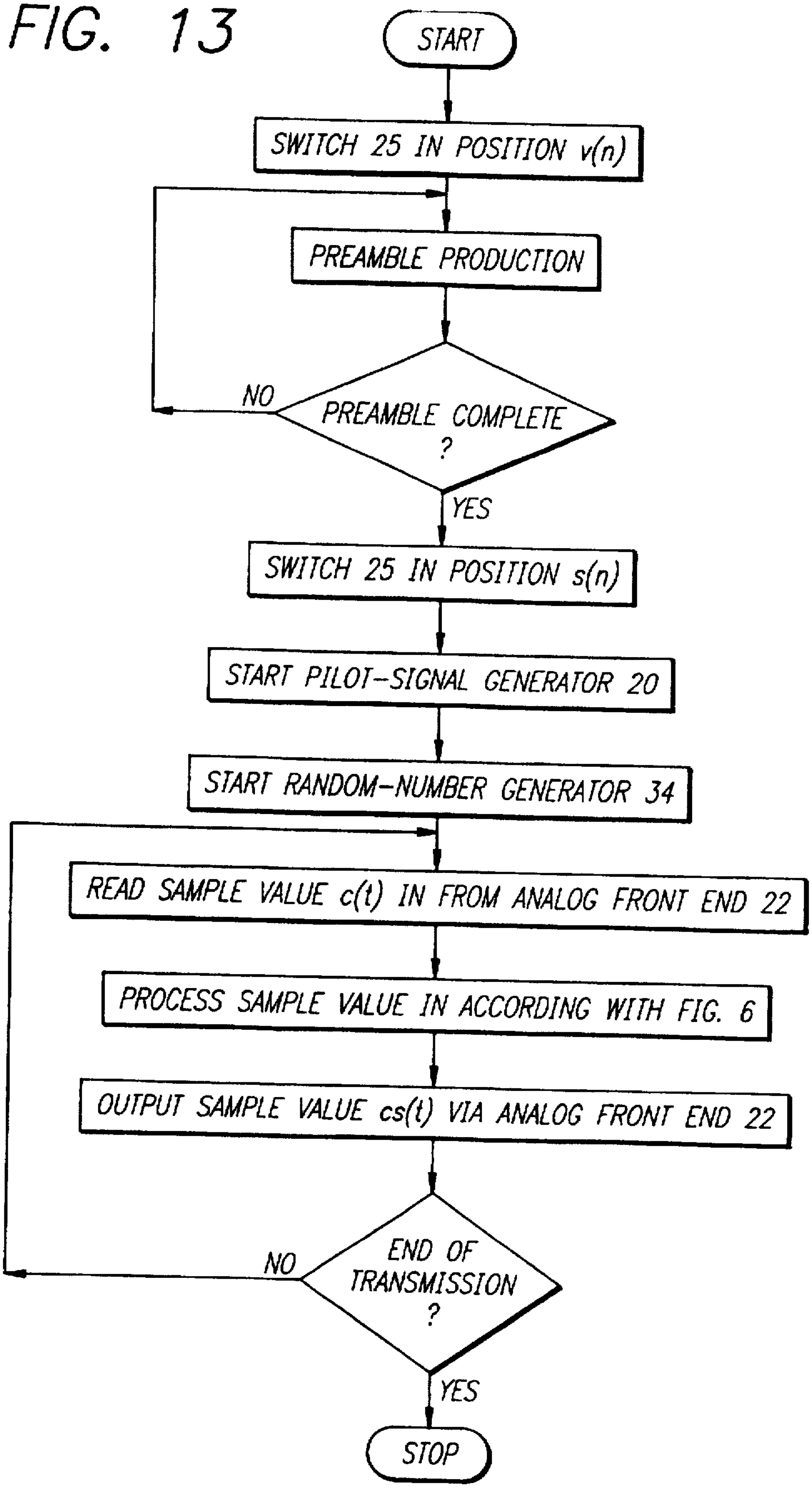
FIG. 13 is a flow diagram for illustrating the signal processing at the transmitting end in accordance with the arrangement of FIG. 6 above.

Further details are presented in the following detailed description of the transmitting end and of the receiving end. FIG. 6 is a detailed block diagram of the signal processing at the transmitting end during encryption. The individual functional blocks are described in more detail in following sub-sections. All the signal processing functions illustrated by the flow diagram of FIG. 13 are implemented with the aid of the single signal processor 1 (cf. FIG. 1). The double lines and double arrows of FIG. 6 denote analytical signals. Real signals are represented by single lines and arrows.

In principle, it is possible to distinguish between three types of signal processing, analog signal processing in the analog front end 22, digital signal processing at the clock rate of 8 kHz, and digital signal processing at the clock rate of 2.667 kHz (8/3 kHz). As illustrated in FIG. 6, the corresponding signals are distinguished by the following parameter designations: t=analog, ν=digital, 8 kHz clock and n=digital, 2.667 kHz clock.

A clear mode is implemented by simple feedback on the digital side of the analog front end 22. At this point, it should be mentioned that the field of operation of the prototype SE module of the invention is found in present-day analog transmission channels.

The analog front-end unit 22 at the receiving end is for level matching, sampling of the analog input signal c(t), and conversion into a digital signal c(v). The A/D converter section of the analog front end 22 (not illustrated in detail) consists of two analog input amplifiers and an A/D converter. The following specifications apply to the A/D converter section of the analog front end 22 for a tested prototype SE module:

| | |
|---|---|
| Sampling frequency: | 8 kHz |
| Word length: | 16 Bit |
| Decimalization filter | |
| Pass band: | 0 to 3.7 kHz |
| Ripple: | ±0.2 dB |
| Reverse attenuation: | 65 dB |

For further details of the construction and operation of the analog front end 22, reference should be made to Ref. [1] and Ref. [2] of the bibliography specified in the Annex.

The digitized input signal c(v) acts on a first complex input filter 30 to suppress the lower sideband. The filter 30 also insures that the bandwidth of the input signal (digitized voice signal) is limited to one that corresponds to that of the transmission channel (i.e. 2.667 kHz in the present exemplary embodiment.) The complex first input filter 30 produces, from a real input signal, a complex output signal consisting of a real part and an imaginary part with a phase shift of 90° existing (analytical signal) between the real and imaginary parts for any desired frequency. At the same time, spectral elements outside the usable bandwidth of the transmission channel are suppressed. Preferably, and in the tested embodiment of the invention, the first complex input filter is a higher-order Hilbert filter (as is the complex input filter at the receiving end; cf. below).

The first Hilbert filter 30 at the receiving end is a recursive filter whose transfer function is given by $$H(z)=\frac{\sum_{i=0}^{16} a_i \cdot z^{-i}}{\sum_{i=0}^{16} b_i \cdot z^{-1}} \quad (1)$$

Figure 7:
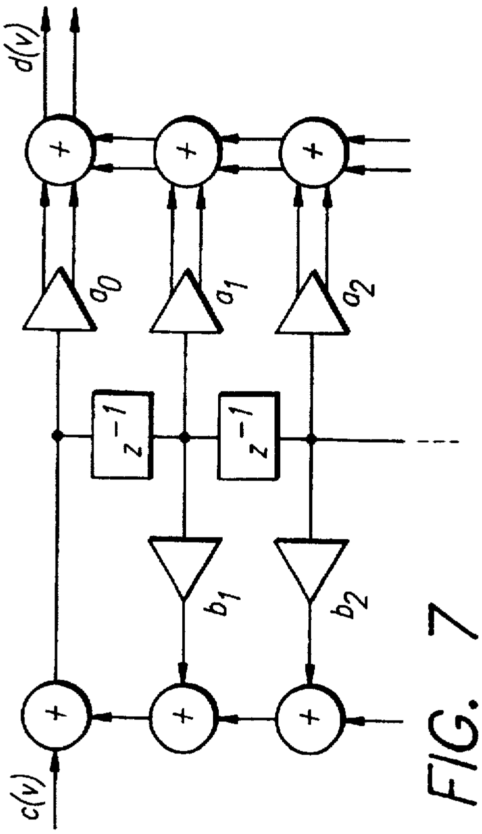
FIG. 7 is a functional diagram of the structure of a (first) complex filter on the input side, preferably a Hilbert filter.

The structure of this filter is illustrated in FIG. 7.

The input signal to the Hilbert filter 30 is, as mentioned, the sampled, real received signal c(v). The recursive part of this filter has only real coefficients $b_i$, so that only real operations are required. The transverse part has complex coefficients $a_i$.

Figure 8:
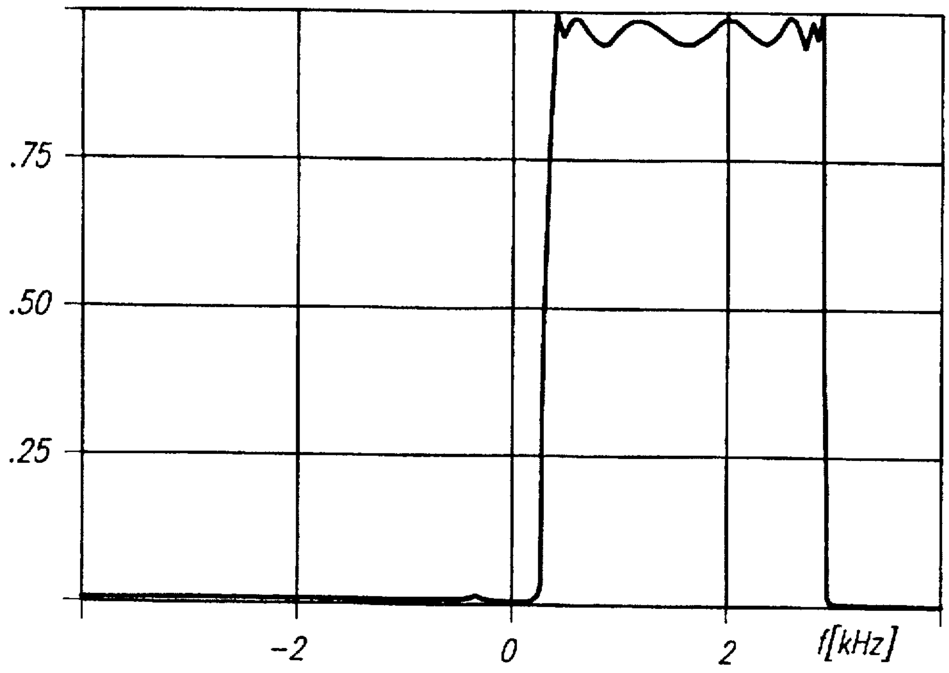
FIG. 8 is a graph of the frequency response of the (first) complex filter on the input side in accordance with the structure illustrated in FIG. 7.

The design of the first Hilbert filter 30 is based on that of an elliptical low-pass filter. The low-pass filter is converted into a Hilbert band-pass filter by transformation in the frequency domain. The frequency response of the Hilbert filter 30 implemented in the prototype of the invention is shown in FIG. 8. The band-limited output signal d(v) of the first complex input filter (Hilbert filter) acts on a functional block designated as sampling rate reduction 31 in which the sampling clock is reduced by a specific, preferably integer factor. In the present exemplary embodiment, the sampling clock is reduced by the factor 3 to 2.667 kHz. Suitable dimensioning of the first Hilbert filter 30 on the input side assures that no aliasing effects occur. The combination of the Hilbert filter 30 and the sampling reduction 31 causes any randomly selected frequency band of 2.667 kHz width to contain all of the useful information. In principle, only every third output value of the input-side signal c(v) of the Hilbert filter 30 is used for sampling rate reduction. In practice, this is implemented by operation of the transverse part of the Hilbert filter 30 at 8/3 kHz. As such, the filter output values are calculated and further-processed only with every third clock pulse of the 8 kHz sampling clock.

The pilot signal generator 20 produces a pilot signal q(n) used at the receiving end for clock slaving. The pilot signal is produced by phase modulation as described below.

The (pseudo-) random-number generator 34 (refer to FIG. 6), a part of the code signal generator 23, produces equally distributed numbers in the range from, for example, 1 to 64. Such numbers select random values from a field of 64 complex values (refer to "data set" block of FIG. 6). Two code signals $z_s(n)$, $Z_p(n)$ are derived from the selected values, one of which ($z_s(n)$) is used for phase modulation of the information signal and the second ($z_p(n)$) used to produce the pilot signal q(n).

The random-number generator 34 implemented in the present embodiment is based on linear congruence. The random values r(n) are calculated in accordance with the rule $$r(n)=(a \cdot r(n-1)+c) \bmod m \quad n=1, 2 \quad (2)$$

The start value r(0) is in general unimportant since all m possible values are produced before the random sequence is repeated, provided that the constants a and c are suitably selected. The random numbers generated are distributed uniformly from 0 to (m−1).

In the tested embodiment, $m=2^{32}$ was employed, allowing a long sequence to be produced. In addition, the Modulo function of equation 2 can then be simply implemented by the signal processor 1. Constants a=1664525 and c=32767 were selected in accordance with Knuth's rule (cf. Ref. [6]).

To obtain uniformly distributed random numbers between 1 and 64, it is sufficient to consider 6 bits of the respective random value r(n), using them as a random number. In a current embodiment, 6 bits are employed for generation of random numbers for "scrambling" (the phase modulation) of the information signal x(n) and 6 bits for the generation of random numbers for scrambling (the phase modulation) of pilot tone p(n). Thus, the random-number generator 34 supplies two random numbers $r_s(n)$ and $r_p(n)$ in each case per clock cycle.

After each transmission of a preamble, the random-number generator 34 is reinitialized with a defined start value x(0). The control values for the phase modulators 32 and 33 are represented by a data set of 64 complex values. The random-number generator 34 selects values from this set and produces a random signal for phase modulation.

The 64 complex values $$a_i = e^{j2\pi i/64} \quad i = 1, 2, \ldots, 64 \quad (3)$$

are used as the data set. The control or input values $z_s(n)$ and $z_p(n)$ are all of amplitude "1" and differing phases. The random-number-controlled phase modulators 32, 33 are discussed in greater detail below.

Two phase modulator units 32 and 33 are required for the transmission section of the SE module (FIG. 6). One phase modulator 33 is required for encryption of the information signal x(n) by a code signal $z_s(n)$ supplied by the random-number generator 34. The other phase modulator 32 generates the pilot signal q(n) from the pilot tone p(n), supplied by the pilot-tone generator, with the aid of the other code signal $z_p(n)$. Since the code signals $z_s(n).z_p(n)$ are random sequences of complex values of the same amplitude but different phases, each phase modulator 32, 33 carries out a complex multiplication of the respective input signal value by the respective code signal value.

If, as FIG. 6 illustrates, the signal values of the analytical filter output signal are designated by x(n) and the signal values of the associated code signal by $z_s(n)$, then, for the signal values of the phase-modulated information signal:

$$y(n)=x(n)\cdot z_s(n) \qquad (4)$$

The phase-modulated information signal y(n) resembles a noise signal. The information contained in the information signal is completely distributed over a frequency band with a width of 2.667 kHz.

It should be noted that phase modulation according to the invention possesses a certain similarity to a 64-stage PSK modulation as employed in digital transmission technology. However, its purpose is quite different. In digital data transmission using PSK modulation, the phase of a carrier signal is keyed at the sampling clock rate (Phase Shift Keying). The phase of the carrier signal thus contains the digital information to be transmitted. At the receiving end, the phase of the carrier is determined at defined sampling times. A discriminator assigns the corresponding digital information to each determined phase and thus obtains the transmitted information.

On the other hand, in phase modulation according to the invention the signal to be modulated carries the information to be transmitted, rather than the modulation signal. This information is predetermined by its quasi-continuous signal profile. The phase modulation is employed solely for changing the signal to be transmitted to make it no longer possible to deduce the original signal profile. A voice signal thus becomes completely incomprehensible. The useful information is encrypted by the phase modulation.

At the receiving end, the useful information can be recovered by the inverse operation of equation 4

$$x(n)=\frac{\hat{y}(n)}{z_s(n)} \qquad (5)$$

Complete recovery is possible only when two conditions are satisfied. First, the received signal $\hat{y}(n)$ must correspond with the (phase-modulated) transmitted signal y(n). Second, the modulation signal, i.e. the code signal $z_s(n)$, must be known at the receiving end.

The first requirement depends upon equalization of the transmission channel at the receiving end. The second requirement depends upon knowledge of the code signal and exact synchronization at the receiving end.

While the number of values of the code signal $z_s(n)$ is defined by the number of steps in the modulation (64 in this case), the number of possible values for x(n) and y(n) is determined by word length in the signal processing.

If the signal values of the generated pilot tone are designated by p(n) and the signal values of the associated code signal by $z_p(n)$, then the signal values of the pilot signal are given by the relationship $$q(n)=p(n)\cdot z_p(n) \qquad (6)$$

Thus, due to properties of the selected random-number generator 34, the pilot signal q(n) generated comprises white noise.

Transmission of the analytical signal generated at the clock frequency of 2.667 kHz requires that the transmitted signal be matched to the transmission channel. In the illustrated example, the sampling frequency predetermined by the analog front end 22 is 8 kHz. Accordingly, the sampling rate must first increase to 8 kHz. The increase in the sampling rate by a factor of 3 (i.e. from 2.667 kHz to 8 kHz) is accomplished by the insertion of two signal values, in each case of value 0, between two existing signal values. Thus, $$d_s(v)= \ldots, w(n-1), 0, 0, w(n), 0, 0, w(n+1) \qquad (7)$$

The sampling rate increase is done in conjunction with a first complex output filter 35 for matching the analytical transmitted signal to the transmission channel. The real part of the analytical output signal from the complex output filter 35 is supplied to the analog front end 22.

The first complex output filter 35 initially produces an analytical signal, whose real part and imaginary part are phase-shifted through 90° for any given frequency, from a complex input signal $d_s(v)$. A real output signal $c_s(v)$ is provided from the analytical signal. At the same time, spectral elements outside the useable bandwidth of the transmission channel are suppressed.

Figure 9:
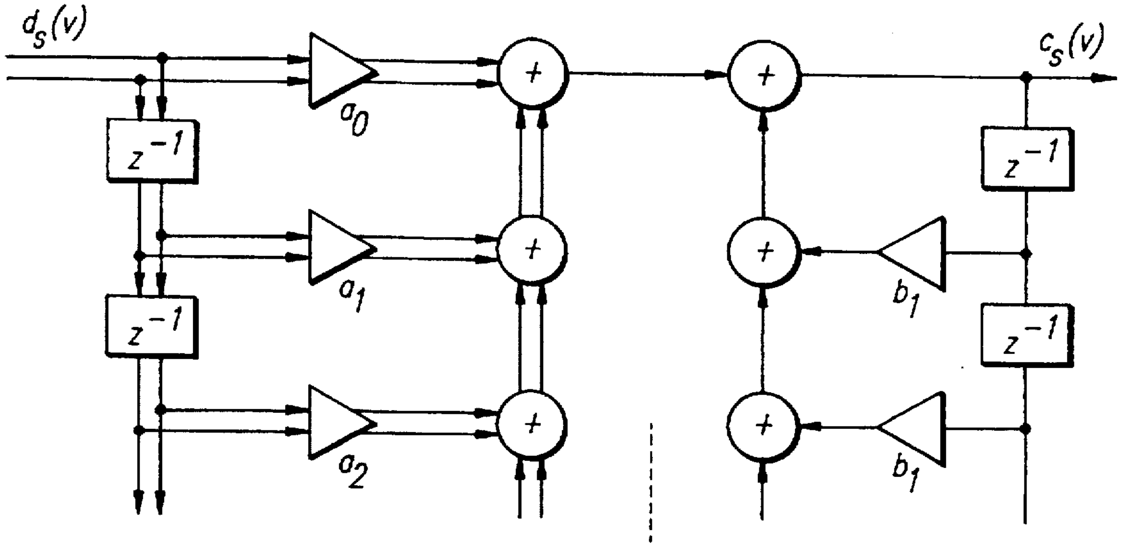
FIG. 9 is a functional diagram of the structure of a first complex output filter, preferably a Hilbert filter, of the transmitting section of the SE module.
Figure 10:
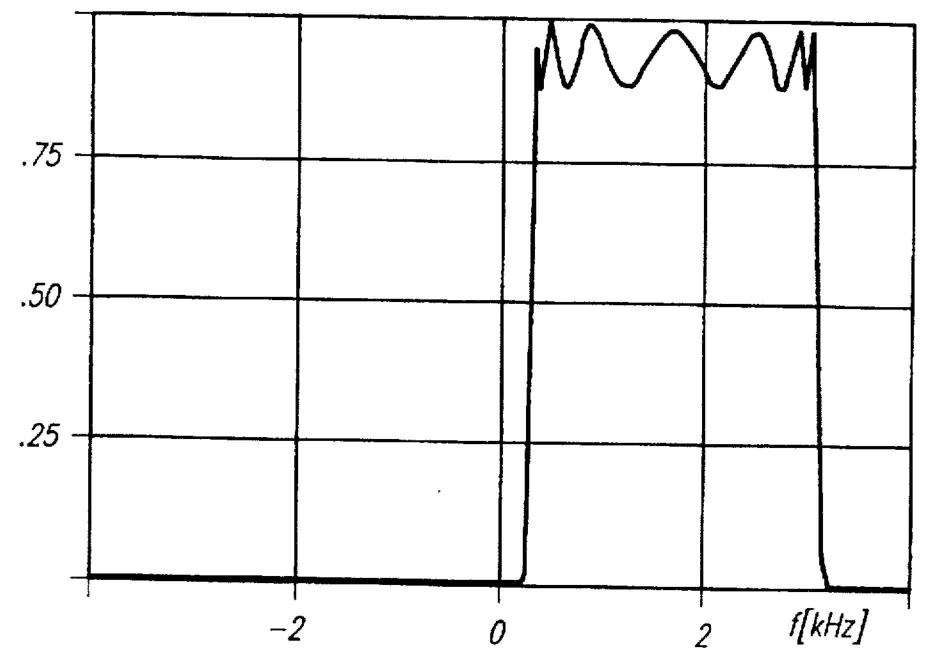
FIG. 10 is a graph of the frequency response of the first complex output filter in accordance with FIG. 9.

The first complex filter 35 on the output side is preferably a (second) Hilbert filter, i.e. a recursive filter, whose structure is shown in FIG. 9. The input signal $d_s(v)$ to the second Hilbert filter 35 is, as mentioned, an analytical signal; the output signal $c_s(v)$ is a real signal. The design of the filter is based on an elliptical low-pass filter. The low-pass filter is subsequently converted into a Hilbert band-pass filter by transformation in the frequency domain. The frequency response of the (second) Hilbert filter 35 on the output side at the transmitting end is shown in the graph of FIG. 10. The conversion of the digital output signal $c_s(v)$ from the second Hilbert filter 35 into an analog output signal is carried out in the output section of the analog front end 22 (reference block **22*b* of FIG. 3**) and includes level matching.

In the implementation, the D/A converter unit 3 (FIG. 1) of the analog front end 22 (without detailed illustration) consists of a D/A converter, an analog smoothing filter, a programmable amplifier and a differential amplifier.

The following specifications apply to the output of the analog front end 22 in the illustrated exemplary embodiment of the invention:

| | |
|---|---|
| Clock frequency: | 8 Khz |
| Word length: | 16 bits |
| Gain: | Adjustable in the range from −15 dB to +6 dB |
| Interpolation filter | |
| Frequency response: | 0 to 3.7 kHz |
| Ripple: | ±0.2 dB |
| Reverse attenuation: | 65 dB |

Once again, reference should be made to Ref. [1] and Ref. [2] for more detailed information on the transmitting-end output at the analog front end 22.

The preamble generator 24 generates a preamble at the start of transmission via radio or telephone channel. In order to connect to an ongoing transmission at the receiving end, the generation of a preamble is initiated at fixed time intervals.

The preamble employed consists of two successive signal sections. The first signal section is a so-called CPFSK (Continuous Phase Frequency Shift Keying) signal. The second section comprises a noise-like signal. The first part is employed in the receiver to detect the preamble and to synchronize the receiver. The second signal part is employed to equalize the transmission channel.

The CPFSK signal is generated by CPFSK modulation of a special data frequency. The length of the sequence may be, for example, 240 bits and the transmission rate 1.778 kbit/s. The structure of the data sequence is selected so that very reliable detection of the preamble can be accomplished employing a special method at the receiving end. Once again, reference is made to U.S. Pat. No. 5,267,264 (Ref. [4]) and to Ref. [5] for further details. The duration of the preamble of the example is approximately 230 ms.

Two different operating modes of the SE module can be distinguished at the receiving end. One is the preamble recognition phase, during which the SE module is in the clear position, and the other is the decryption phase. Likewise, three types of signal processing, namely analog signal processing, digital signal processing at the 8 kHz clock rate and digital signal processing at the clock rate of 2.667 kHz can be distinguished as in the case of the transmitting end. Calculation of the equalizer coefficients runs in the background, without linkage to a specific sampling clock.

Figure 11:
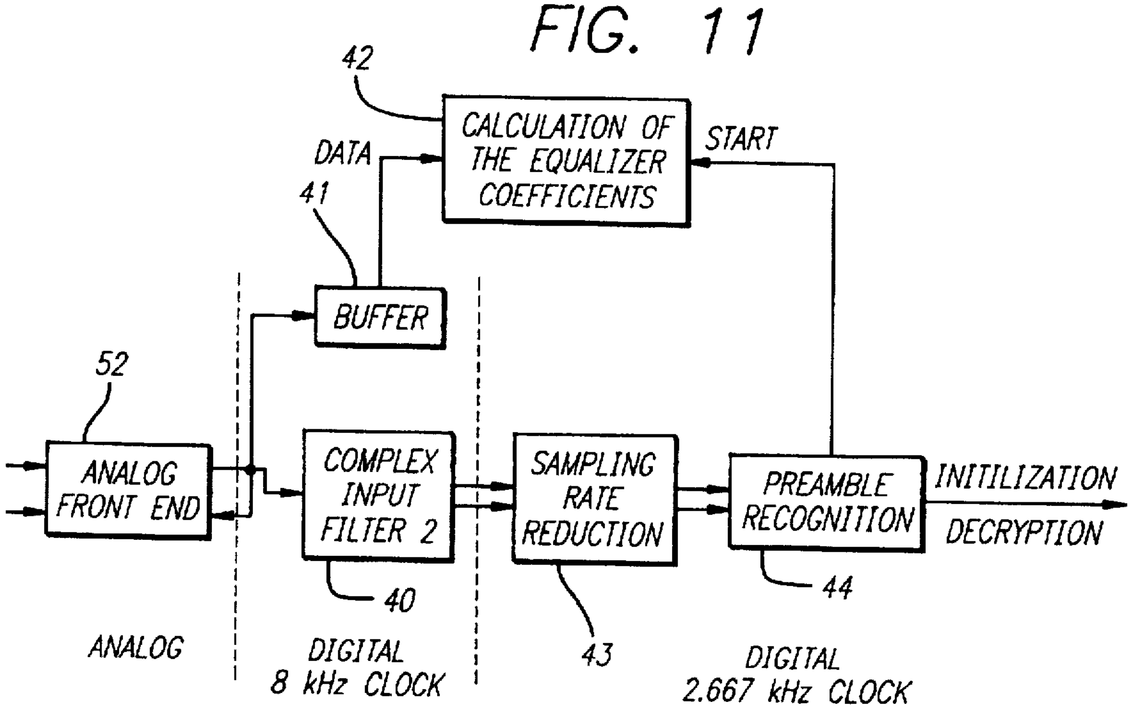
FIG. 11 is a block diagram for illustrating the signal processing at the receiving end in the preamble recognition phase (clear position)

After the apparatus has been switched on, the SE module remains in the preamble recognition phase. FIG. 11 is a functional block diagram of such signal processing. In this phase, the received signal passes only through the analog front end 52 with its filter. The received signal remains essentially uninfluenced by the SE module.

The sampled received signal (8 kHz sampling frequency, 16 bit word length) is supplied to a second complex input filter 40, preferably a third Hilbert Filter (band-pass filter), at the receiving end after filtering, and to a sampling rate reduction 43 to 2.667 kHz to the preamble recognition block 44. At the same time, the sample values of the received signal are buffer-stored in the buffer 41. The preamble recognition block 44 automatically and very reliably detects reception of the preamble. References can be found in Ref. [4] (U.S. Pat. No. 5,267,264) and Ref. [5]. The operation and structure of the second complex input filter 40 correspond essentially to the first complex input filter 30 at the transmission end, described above.

Preamble recognition serves two functions: (1) detection of the reception of the preamble and the changeover to decryption; and (2) the preamble supplies an exact time reference, necessary for initialization and synchronization of the decryption process. Thus, initialization of a random-number generator 54 (at the receiver end) and a pilot-signal generator 50 occur with recognition of the preamble. In addition, a process is initiated for determining equalizer coefficients. The calculated coefficient set is used to set an equalizer 51 that is required for the decryption mode.

The second section of the preamble, i.e., the noise signal, is evaluated to determine the equalizer coefficients. This requires waiting until a specific part of that section is in the buffer 41. The pulse response and the coefficient set for the equalizer filter 51 are then calculated with the aid of an FFT (Fast Fourier Transformation) and a nominal spectrum that is present in the receiver and stored in the program RAM 5 (FIG. 1).

Figure 12:
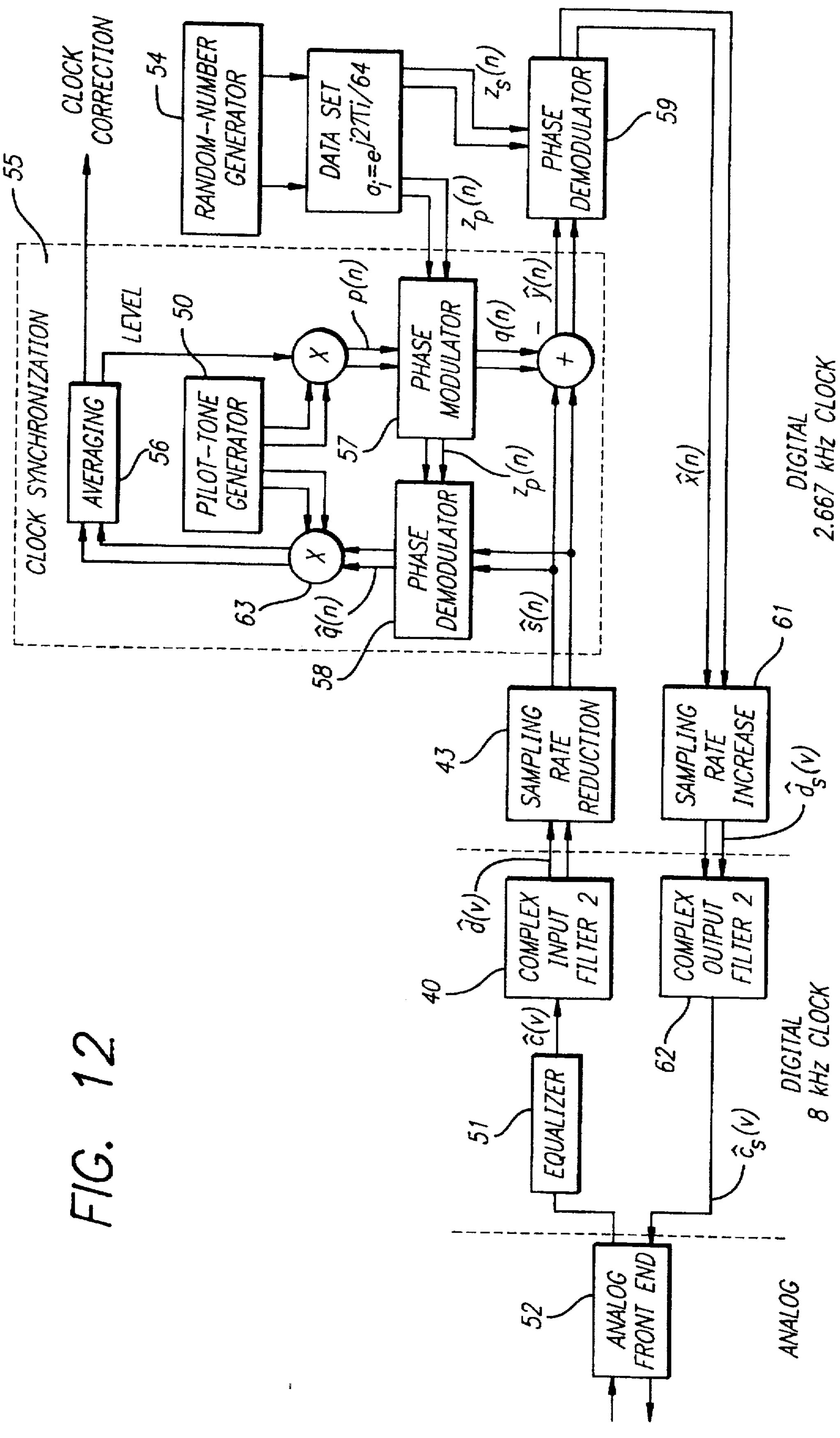
FIG. 12 is a block diagram for illustrating the signal processing at the receiving end (decryption phase)
Figure 14:
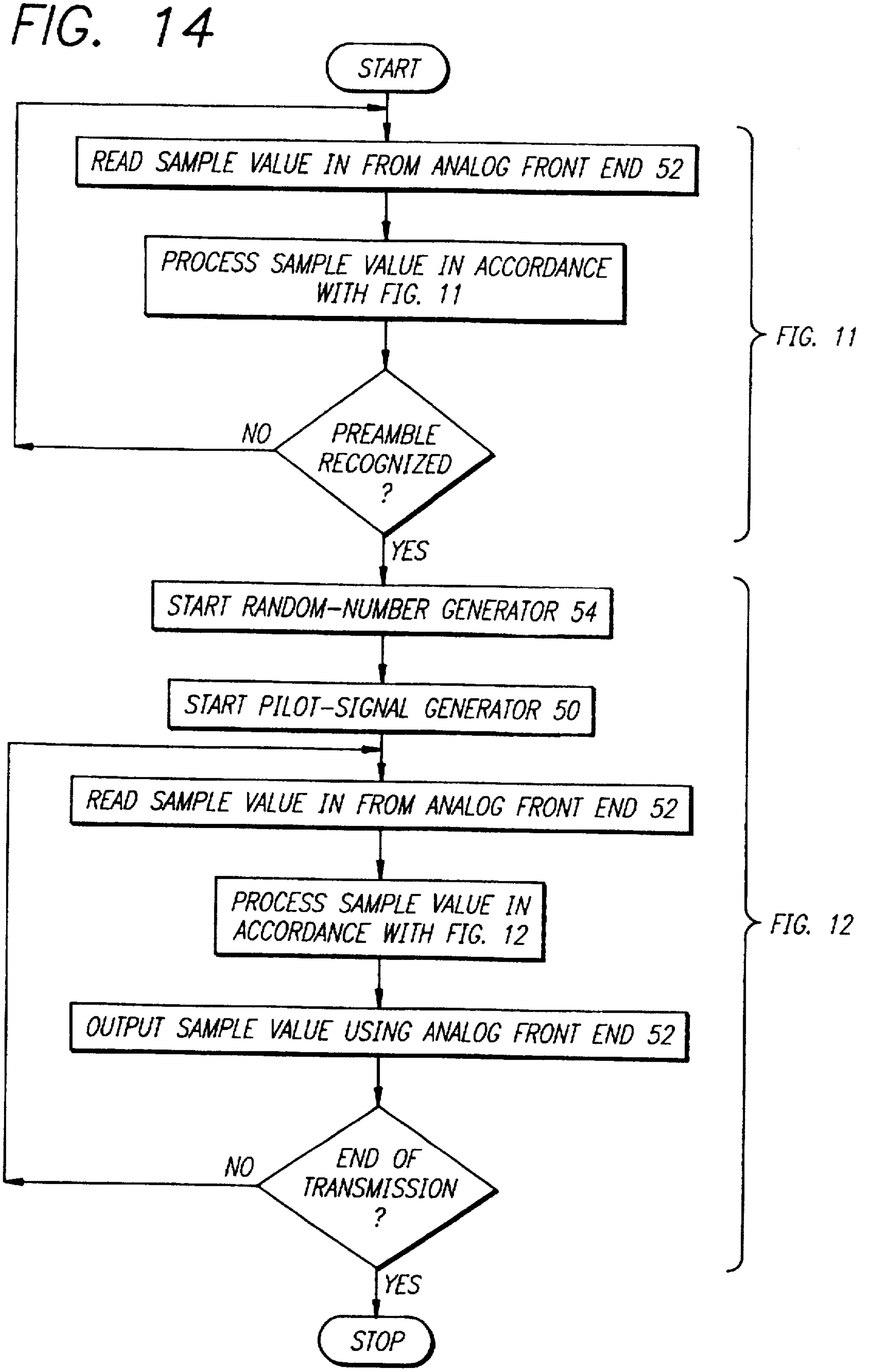
FIG. 14 is a flow diagram of the signal processing at the receiving end in accordance with the arrangements of FIGS. 11 and 12 above.

After recognition of the preamble, the SE module is in the decryption mode. FIG. 12 illustrates the signal processing in this phase. The flow chart of the functional sequence steps of the signal processing at the receiving end is presented in FIG. 14.

The received signal is converted by the analog front end 52 into a digital signal with, for example, an 8 kHz sampling frequency and a 16 bit word length. This signal passes through the equalizer 51, whose object is equalization of the transmission channel as explained below. After filtering via the second complex input filter 40 (preferably a third Hilbert filter; band-pass filter; described in greater detail below) and a sampling rate reduction 43 by the factor 3, an analytical signal is provided of sampling frequency 2.667 kHz. Such signal $\hat{s}(n)$ consists of the encrypted information signal and the superimposed pilot signal. As described above, the pilot signal is phase-modulated. It is evaluated and separated from the information signal in the clock synchronization block 45. Decryption of the information signal is subsequently carried out by a phase demodulator (descrambler) 59.

Once a sample rate increase 61 to 8 kHz and subsequent filtering using a second complex output filter 62, especially a fourth Hilbert filter (band-pass filter), has been performed, the conversion to an analog signal, the decrypted audio signal, takes place in the receiver-end analog front end 52. The operation and arrangement of the second complex output filter 62 correspond essentially to that of the first complex output filter 35.

Evaluation of the pilot signal in the clock synchronization block 55 additionally provides a controlled variable for regulating out fluctuations of the sampling clock (clock correction). The regulation of the sampling clock is required because of the stringent requirements for synchronicity during decryption. Fluctuations in the sampling clock are caused by parameter variation between equipment and drifts of the crystal oscillators.

To evaluate the pilot signal, the received signal $\hat{s}(n)$ passes through a phase demodulator (descrambler) 58 at a reduced sampling rate. The output signal $\hat{q}(n)$ of the phase modulator 58 consists of a carrier signal element and a superimposed signal element, such as a noise signal, produced from the information signal. The carrier signal is converted into the baseband signal by means of the signal generated by the pilot-tone generator 50. After an averager 56, an analytical baseband signal is provided whose real part is a measure of the level of the pilot signal and whose imaginary part is used as a control variable for regulating the sampling clock.

Using the determined level of the pilot signal, the pilot-signal generator 50 and a phase modulator (scrambler) 57, a pilot signal q(n) is generated at the receiving end and is subtracted from the received signal $\hat{s}(n)$. In the ideal case, the generated pilot signal q(n) corresponds exactly to the received pilot signal so that the information signal is completely separated from the pilot signal by subtraction. If the equalization is optimal, then the signal $\hat{y}(n)$ obtained by subtraction corresponds, except for any superimposed noise signal, to the signal y(n) at the output of the phase modulator 33 of the transmitting end (cf. FIG. 6).

The phase modulator 57 and the two phase demodulators 58, 59 are controlled by two (pseudo-) random-number generators 54. One random-number generator controls the phase modulator 57 and the phase demodulator 58 of the clock synchronization block 55. The other controls the phase demodulator 59 for decryption of the information signal y(n). The random-number generators correspond to those of the transmitting end; they are synchronized to the received signal, just as is the pilot-signal generator 50, by the recognition of a preamble.

The objects and the implementation of the individual functional blocks of FIG. 12 are described in detail as follows: The input section of the analog front end 52 has the object of level matching, sampling the analog received signal, and conversion into a digital signal. An AD28msp02 chip may be utilized as the analog front end 52 in a prototype implementation (cf. Ref. [3]). Such a chip corresponds to the analog front end used in the ADSP-21msp55 signal processor.

The analog front end 52 consists of two analog input amplifiers, a 20 dB preamplifier which can be connected and an A/D converter. The following specifications apply to the A/D converter section of the analog front end 52:

| | |
|---|---|
| Sampling frequency: | 8 kHz |
| Word length: | 16 Bit |
| Decimalization filter | |
| Pass band: | 0 to 3.7 kHz |
| Ripple: | ±0.2 dB |
| Reverse attenuation: | 65 dB |

The equalizer 51 is employed to equalize the frequency response of the transmission channel in the region of the transmission bandwidth from, for example, 300 Hz to 3 kHz.

The transmission channel contains all assemblies from the first complex output filter 35 of the transmission section to the second complex input filter 40 of the receiving section (both inclusive).

The equalizer 51 is implemented by a transverse digital filter having 128 stages. The equalizer 51 transfer function is:

$$E(z)=\sum_{i=0}^{127} e_i \cdot z^{-i} \tag{8}$$

The coefficients $e_i$ are determined during the reception of a single preamble.

The second complex input filter 40 (Hilbert filter) is used to suppress the lower sideband of the input signal and to limit the bandwidth of the input signal (received voice signal) to approximately 2.66 kHz.

The second complex input filter 40 (Hilbert filter) is a recursive filter whose structure corresponds to that of the input-side first complex filter 30. To such extent, reference can be made to FIG. 7. The input signal to the second complex input filter 40 is the real output signal c(v) from the equalizer 51. The design of this filter is based on an elliptical low-pass filter. The low-pass filter is converted into a Hilbert band-pass filter by transformation in the frequency domain.

A sampling rate reduction 43, for reducing the sampling rate in the illustrated example by the factor "3" to 2.667 kHz, is also carried out in the receiving section, in a manner analogous to the transmitting section. Suitable dimensioning of the second complex input filter 40 ensures that no aliasing effects occur.

The combination of a complex input filter 40 and sampling rate reduction 43 results in any selected frequency band of 2.667 kHz bandwith containing all the useful information.

In practice, the processing of each third output value of the second complex input filter 40 is accomplished as the transverse part of the filter is operated at 8/3 kHz. As a consequence, the filter output values are calculated and processed further only in every third clock cycle of the 8 kHz sampling clock.

The pilot-tone generator 50 supplies an identical signal to the pilot-signal generator 37 at the transmitting end. This signal is required in the clock synchronization block 55 to convert the received and demodulated pilot signal $\hat{q}$(n) into the baseband signal, and for receiving-end generation of a phase-modulated pilot signal q(n).

As mentioned, the averager 56 is employed for averaging the analytical signal $\hat{q}$(n) transformed to the baseband. In this way, the level of the received pilot tone is provided as the real part and a control variable for sampling clock slaving (clock correction) is produced as the imaginary part. Averaging is implemented so that, after every 128 sampling clock cycles, the mean is formed over the last 128 input signal values $\hat{q}$(n), transformed into the baseband signal.

The random-number generator 54 produces uniformly distributed numbers in the range from 1 to 64, entirely analogously to the operation of the random-number generator 34 of the transmitting end. The numbers are used to select random values from a field of 64 complex values. Once again, two code signals $z_p$(n) and $z_s$(n) are produced from the selected values. One of these ($z_s$(n), is used for phase demodulation, i.e. for decryption of the information signal $\hat{y}$(n), and the other, ($z_p$(n)), is employed in the clock synchronization block 55 for decryption of the received pilot signal and for generation of the receiving-end pilot signal. Because of clock synchronization, the code signals are, of course, identical to the code signals $z_p$(n) and $z_s$(n) at the transmitting end. The implementation of the random-number generator 54 is identical to that of the transmitting section, whereby reference can be made to the above-described designs.

The random numbers supplied to the phase modulator 57 and to the phase demodulators 58 and 59 consist of a set of 64 complex values from which discrete values are selected by the random-number generator 54. In an analogous manner to the transmitting end, the same 64 complex values $$a_i = e^{j2\pi i/64} \quad i=1, 2, \ldots, 64 \tag{9}$$

are employed as the data set.

The two above-mentioned phase demodulators 58, 59 are required in the receiving section of the SE module. One phase demodulator 59 is used for decryption of the useful signal $\hat{y}$(n) by one code signal $\hat{z}_s$(n). The other phase demodulator 58 is used for recovery of the pilot tone from the received pilot signal. As already mentioned, these code signals must be identical to the code signals at the transmitting end.

If the signal values of the analytical input signal after the sampling reduction 43 are designated by $\hat{s}$(n), the signal values of the code signal of the pilot tone are designated by $z_p$(n), then, for the signal values at the output of the phase demodulator 58 in the clock synchronization block 55:

$$\hat{q}(n)=\frac{\hat{s}(n)}{z_p(n)} \tag{10}$$

If the encrypted information signal is designated by $\hat{y}$(n) and the code signal for the encryption is designated by $z_s$(n), then, for the decrypted signal at the output of the phase demodulator 59:

$$\hat{x}(n)=\frac{\hat{y}(n)}{z_s(n)} \tag{11}$$

The phase modulator 57 is used to generate the pilot signal from the pilot tone supplied by the pilot-tone generator 50.

If the signal values of the generated pilot tone are designated by p(n), then the signal values of the phase-modulated pilot tone result from the relationship:

$$q(n)=p(n)\cdot z_p(n) \tag{12}$$

In order to convert the digital analytical signal $\hat{x}$(n) generated at a clock frequency of 2.667 kHz into an analog signal, it is first necessary to carry out a sampling rate increase to 8 kHz. The increase in the sampling rate by the factor 3 (from 2.667 kHz to 8 kHz in the illustrated example) is carried out by inserting two signal values having a "0" value in each case between the two values, corresponding to the following relationship:

$$\hat{d}_s(v)=\ldots, \hat{x}(n-1), 0, 0, \hat{x}(n), 0, 0, \hat{x}(n+1), \tag{13}$$

A further (second) complex output filter 62, preferably a (fourth) Hilbert filter, converts the analytical output signal into a real output signal. This filter is used to limit the bandwidth of the output signal (voice signal) to approximately 2.667 kHz. The second complex output filter 62 is again a recursive filter whose structure corresponds to that of the first complex output filter 35 at the transmitting end and is illustrated in FIG. 9. The input to the second complex output filter 62 (fourth Hilbert filter) is again an analytical signal, the output signal a real signal. In the tested exemplary embodiment of the invention, the filter is based upon an elliptical low-pass filter. The low-pass filter is converted into a Hilbert band-pass filter by transformation in the frequency domain.

The analog front end 52 at the output side converts the digital output signal into an analog output signal (audio signal) and also includes level matching. The D/A converter section (not shown in detail) of the analog front end 52 (output) consists of a D/A converter, an analog smoothing filter, a programmable amplifier and a differential amplifier.

The following specifications apply to the output of the analog front end 52:

| | |
|---|---|
| Clock frequency: | 8 kHz |
| Word length: | 16 Bit |
| Gain: | Adjustable in the range from −15 dB to +6 dB |
| Interpolation filter | |
| Frequency response: | 0 to 3.7 kHz |
| Ripple: | ±0.2 dB |
| Reverse attenuation: | 65 dB |

The essence of the invention is in no way limited to the described embodiment of an SE module. Extensions of the invention, primarily directed to the security of encryption, will be appreciated by those skilled in the art. For example, while, in the described exemplary embodiment, only a simple (pseudo-) random-number generator is employed for generating the code signals, separate, different generators might be utilized to further improve encryption security.

Further, while, in the described exemplary embodiment, it has been assumed that the random-number generator 54 is initiated at the same starting point on every resynchronization, security of encryption may be increased by changing the starting point on every resynchronization. This may be achieved by transmitting the starting point of the random-number generator 54 in the preamble.

Other variations of the invention will, of course, be apparent to those skilled in the art. While the invention is defined by the following set of patent claims, all such variations are contemplated within the scope of such claims and their equivalents.

BIBLIOGRAPHY

[1] Analog Devices: ADSP-2100 Family User's manual. Prentice Hall, 1933.

[2] Analog Devices: ADSP-21msp50/55/56 Datasheet, Mixed-Signal-Processor.

[3] Analog Devices: AD28msp02 Datasheet, Voiceband Signal Port.

[4] U.S. Pat. No. 5,267,264 issued in the name of inventors Erhard Schlenker and Günter Spahlinger for "Synchronization and Matching Method For a Binary Baseband Transmission System" on Nov. 30, 1993.

[5] E. Schlenker: A Method For Determining the Signal-Matched Receiving Filter and the Initial Synchronization of a Digital Receiver. [Ein Verfahren zur Bestimmung des signalangepaβten Empfangsfilters und der Anfangssynchronisation eines digitalen Empfängers]. Dissertation, Stuttgart University, Network and System Theory Institute, [Institut f ür Netzwerk- und Systemtheorie] 1993.

[6] D. E. Knuth: The Art of Computer Programming: Volume 2/Seminumerical Algorithms, Second Edition, Reading, MA: Addison-Wesley Publishing Company, 1969.

What is claimed is:

1. A method for speech encryption and decryption of a voice transmission comprising the steps of:

a) converting the digitized voice signal into a complex signal at a transmitting end by means of a first complex input filter whose bandwidth corresponds to that of the transmission channel; then b) phase-modulating said complex signal at said transmitting end by means of a code signal that is controlled by pseudo-random numbers; then c) additively combining said phase-modulated voice signal with a pilot signal that is also phase-modulated in a pseudo-random distribution at said transmitting end to form an encrypted information signal for transmission; then d) passing said information signal through a first complex output filter at said transmitting end in a sequential manner together with a preamble for synchronization and information signal equalization at a receiving end, as a complex signal, to produce a real output signal; then e) converting said real output signal to an analog signal at said transmitting end; then f) passing said analog signal to a transmitted signal conditioner at said transmitting end; and g) converting said digitized received signal to a complex signal at a receiving end by means of a second complex input filter whose bandwidth corresponds to the bandwidth of said transmission channel; then h) beginning decryption of said complex signal at said receiving end during a preamble recognition phase by forcing clock synchronization for a pilot signal produced and phase-modulated in a pseudo-random sequence initialized by said preamble and calculating equalizer coefficients for an equalizer; then i) separating said encrypted information signal from said phase-modulated pilot signal, which is superimposed at said transmitting end, by linking with said synchronized phase-modulated pilot signal produced at said receiving end, then j) decrypting said phase-modulated, encrypted digital voice signal thus obtained by inverse phase modulation at said receiving end by means of the code signal produced at the receiving end and clock-controlled by means of said preamble; then k) passing as a complex signal through a second complex output filter at said receiving end to produce a real output signal; then l) converting said real output signal to analog; and then m) passing said analog signal to a received signal conditioner at said receiving end.

2. A method as defined in claim 1 characterized in that higher-order Hilbert filters are used as the complex input and output filters.

3. A method as defined in claim 1 characterized in that, at both said transmitting and receiving ends:

a) a sampling rate reduction is carried out in conjunction with a band-limiting complex input filtering; and b) a corresponding sampling rate increase is carried out before said complex output filtering which is matched to said sampling rate increase.

4. A method as defined in claim 3, characterized in that:

a) said sampling rate reduction is carried out in an integer ratio and the sampling rate increase is accordingly likewise carried out in an integer ratio; and b) higher-order recursive filters are employed for said complex filters.

5. A method according to claim 1 wherein:

a) said preamble is transmitted periodically in a fixed time frame; and b) said encrypted voice signal is masked out for the duration of said preamble.

6. A method as defined in claim 5 characterized in that said fixed time frame lasts for a plurality of seconds, and the duration of the preamble is several 10 ms.

7. A method as defined in claim 6 characterized in that:

a) the properties of the transmission channel are tested at the receiving end during reception of said preamble; and b) the filter coefficients for the receiving end equalizer are determined therefrom.

8. A method as defined in claim 7, characterized in that a) the end of each transmitted preamble is detected at the receiver end for resynchronization; and b) a pseudo-random number generator for a code generator is then started, using the obtained signal to decrypt said information signal.

9. A method as defined in claim 1 wherein said random-number-controlled phase modulations of said digitized voice and pilot signals are carried out by different random-number generators.

10. A method as defined in claim 1 wherein the starting point of said random number generator at said receiving end within said preamble is variable.

11. Apparatus for speech encryption and decryption in a voice transmission device of the type that is equipped with a front-end unit for digitizing a voice signal and matching a transmitted signal to a predetermined transmission channel and digitizing a received signal and matching said conditioned received signal to a voice reproduction device comprising, in combination:

a) a code generator at a transmitting end, said generator being controlled by a pseudo-random number generator;

b) said pseudo-random number generator being arranged to act on a digital phase modulator at said transmitting end for phase-modulating said digitized voice signal;

c) a pilot signal generator at said transmitting end for generating a pilot signal;

d) means for phase modulating said pilot signal in a random distribution at said transmitting end;

e) means at said transmitting end for combining said phase modulated voice signal with said modulated pilot signal to form a signal;

f) a preamble generator at said transmitting end for producing a preamble for synchronization at said receiving end and for information-signal equalization;

g) a changeover switch at said transmitting end for sequentially emitting said preamble together with said signal to said front-end unit for transmitted signal conditioning;

h) said changeover switch being operated in a defined clock sequence;

i) a digital equalizing filter at a receiving end whose coefficients are calculated and set during the reception of said preamble for equalization of the transmission channel of the digitized received signal;

j) means at said receiving end for detection of said preamble within said received information signal;

k) said means for detection initiating, as a function of a defined section of said preamble, calculation of said filter coefficients for said equalizer filter in a higher-level computation unit to initialize decryption of said information signal by activating a clock synchronization device;

l) a pilot-tone generator, a random-number generator and a modulator at said receiving end;

m) said clock synchronization device supplying a control signal for sampling clock correction from said received demodulated pilot signal by complex multiplication by a pilot tone generated at said receiving end and, under control of said random number generator initialized with said clock synchronization, also supplying a phase-modulated pilot signal from said pilot tone from said pilot-tone generator via said modulator;

n) means at said receiving end for subtracting said phase modulated pilot signal from said equalized signal to separate said transmitted pilot signal; and o) a phase demodulator controlled by said synchronized random number generator at said receiving end for converting said phase-modulated voice signal into said unmodulated, digital voice signal which is passed to said front-end unit for conversion into an audio signal.

12. Apparatus as defined in claim 11 further including:

a) a first device at said transmitting end for sampling rate reduction; and b) said first device passes said digitized voice signal supplied by said front-end unit at said transmitting end to said phase-modulation device, after band limiting via a first complex input filter on the input side, at a sampling rate reduced by a fixed factor.

13. Apparatus as defined in claim 12 further including:

a) a first device at said transmitting end for sampling rate increasing; and b) said device increases the speech-encrypted transmitted signal, composed of said signal and said preamble, by signal values determined by a fixed factor and passes said signal via a first complex output filter to said front-end unit for transmitted signal conditioning.

14. Apparatus as defined in claim 13 further including:

a) a second device at said receiving end for sampling rate reduction; and b) said device passes said digitized received signal supplied by said front-end unit at said receiving end, on to said phase modulation device, after equalization and band limiting, via a second complex input filter at a sampling rate which is reduced by a fixed factor.

15. Apparatus as defined in claim 14 further including:

a) a second device at the receiving end for increasing the sampling rate;

b) said device increases the modulated received signal by signal values determined by a fixed factor and passes them on via a second complex output filter to said front-end unit at said receiving end for audio signal conditioning.

16. Apparatus as defined in claim 12 wherein said factors for said sampling rate reduction and said sampling rate increase are equal integers.

17. Apparatus as defined in claim 16 wherein said integer is "3".

18. Apparatus as defined in claim 11 wherein said pseudo-random number generator at said transmitting end and said random-number generator at said receiving end supply random values in accordance with the linear congruence method corresponding to $$[r(n)=](a \cdot r(n-1)+c) \bmod m$$

where n=1, 2, . . . , as an integer, a and c designating integer constants and m designate a selectable number.

19. Apparatus as defined in claim 18 wherein said integer constants are a=1664525, c=32767, and $m=2^{32}$.

20. Apparatus as defined in claim 11 wherein the control signal for clock correction and a controlled variable for the level of the pilot signal produced at the receiving end from averaging of the demodulated received pilot signal are obtained over a fixed number of sample values.

21. Apparatus as defined in claim 20 characterized in that the different code signals are in each case used for the statistical phase modulation of the voice signal at the transmitting end and for the demodulation of the received signal after separation of the pilot signal, as well as for the transmitting-end phase modulation of the pilot tone and the receiving-end demodulation of the pilot signal.

22. Apparatus as defined in claim 11 characterized in that Hilbert filters operating as higher-order recursive filters are used as complex filters.

* * * * *